United States Patent
Munzenberger et al.

(10) Patent No.: US 9,121,527 B2
(45) Date of Patent: Sep. 1, 2015

(54) FIRE PREVENTION SLEEVE

(75) Inventors: Herbert Munzenberger, Wiesbaden (DE); Michael Drexl, Schondorf (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 191 days.

(21) Appl. No.: 13/538,453

(22) Filed: Jun. 29, 2012

(65) Prior Publication Data

US 2013/0161030 A1    Jun. 27, 2013

(30) Foreign Application Priority Data

Dec. 22, 2011 (DE) .......................... 10 2011 089 531

(51) Int. Cl.
*F16L 5/04*      (2006.01)
*A62C 2/06*     (2006.01)
*A62C 3/16*     (2006.01)

(52) U.S. Cl.
CPC . *F16L 5/04* (2013.01); *A62C 2/065* (2013.01); *A62C 3/16* (2013.01)

(58) Field of Classification Search
CPC .................. F16L 5/00; F16L 5/04; F16L 5/06; F16L 57/04; F16L 59/145; F16L 55/1026; A62C 3/16; A62C 2/065; A62C 2/06; H02G 3/0412; H02G 3/088
USPC ............ 169/48; 138/110, 128, 159, 167, 106, 138/107, 149
See application file for complete search history.

(56) References Cited

U.S. PATENT DOCUMENTS

| | | | | |
|---|---|---|---|---|
| 3,565,468 A | * | 2/1971 | Garrett | 285/373 |
| 4,302,917 A | * | 12/1981 | Fermvik et al. | 52/220.8 |
| 5,103,609 A | * | 4/1992 | Thoreson et al. | 52/232 |
| 5,421,127 A | * | 6/1995 | Stefely | 52/1 |
| 5,498,466 A | * | 3/1996 | Navarro et al. | 428/408 |
| 5,586,739 A | * | 12/1996 | Gantner et al. | 248/74.1 |
| 6,477,813 B2 | * | 11/2002 | Andresen | 52/220.8 |
| 6,725,615 B1 | * | 4/2004 | Porter | 52/232 |
| 6,862,852 B1 | * | 3/2005 | Beele | 52/220.8 |
| 7,082,730 B2 | * | 8/2006 | Monden et al. | 52/232 |

FOREIGN PATENT DOCUMENTS

| | | |
|---|---|---|
| DE | 2947593 | 6/1981 |
| DE | 102010010210 | 9/2011 |
| WO | 0068608 | 11/2000 |

OTHER PUBLICATIONS

DE Communication, May 10, 2012 in Application No. 102011089531.0 (6 pages).
DE Office Action dated Jun. 16, 2010 (20 pages).

* cited by examiner

*Primary Examiner* — Justin Jonaitis
*Assistant Examiner* — Juan C Barrera
(74) *Attorney, Agent, or Firm* — McAndrews, Held & Malloy, Ltd.

(57) ABSTRACT

A fire prevention sleeve that may be fastened at a wall or ceiling for sealing lines passing through walls or ceilings with an intumescent fire prevention insert, a wall mount encompassing the fire prevention insert, with the fire prevention insert being arranged at its interior, and at least one fastening part projecting radially outwardly in the area of at least one facial side of the wall mount, characterized in that the intumescent fire prevention insert is formed by an elastically deformable molded body, completely filling out the intumescent insert as a space encompassed by the housing.

13 Claims, 3 Drawing Sheets

FIRE PREVENTION SLEEVE

CROSS-REFERENCE TO RELATED APPLICATIONS

The present application claims priority to German Patent Application DE 10 2011 089 531.0, filed Dec. 22, 2011, and entitled "Brandschutzmanschette" ("Fire Prevention Sleeve"), which is hereby incorporated by reference in its entirety.

BACKGROUND OF THE INVENTION

The present invention generally relates to a fire prevention sleeve.

Such fire prevention sleeves are known in several different embodiments. In case of fire they serve to seal penetrations in walls, ceilings, or floors of buildings, through which inflammable or melting pipelines are guided. For this purpose, the fire prevention sleeve is arranged around the pipes such that in case of a fire the then expanding fire prevention insert seals the penetration as tightly as possible. Here, the fire prevention sleeve is usually arranged at the outside of the opening, thus for example at the wall with the penetration extending through it. Common sheet metal may be used as the jacket for the strip of intumescent material. With such a jacket any expansion pressure of the fire prevention insert generated in case of fire may be well supported so that it is ensured that the fire prevention insert is expanded in a targeted fashion in the direction the opening shall be sealed.

In the constructions of prior art it is disadvantageous that the fire prevention insert is embodied as a thin strip of few millimeters, which fails to completely fill the space defined by the jacket so that in case of a given circumference of the sleeve no flexibility is provided with regards to the circumference of the pipelines to be enclosed. Such a certain type of sleeve is only suitable for a certain pipeline diameter and, when the diameter of the pipe to be enclosed is smaller than predetermined by the sleeve, the annular gap between the pipe and the penetration cannot be sealed in a smoke and gas-tight fashion.

In particular, in case of the use of the known fire prevention sleeves for lines, cables, and the like, any retrofitting of additional lines or cables would only be possible by an exchange of already assembled sleeves occurred with sleeves showing a greater diameter. Additionally, the sleeve itself, usually comprising a sheet metal, limits the minimum circumference of the line(s) and cable(s) to be sealed, thus circumferences of arbitrarily small diameters cannot be encased by the sleeve. Accordingly, this fire prevention sleeve cannot be used for sealing individual lines or cables with relatively small diameters.

Due to the fact that the fire prevention insert of fire prevention sleeves of prior art usually show very little compressive features, cable strands comprising several cables, for example, cannot be sealed in a smoke gas-sealed fashion, because the gore between the individual lines cannot be sealed by the fire prevention insert. For this purpose, additional measures are required, such as an additional seal of the passage through the construction part, for example with fire prevention foam, a fire prevention material, or the like.

Further, the fire prevention sleeves of prior art fail to allow any smoke gas sealing in case of cables laid in a very unstructured fashion because they show little flexibility and are designed for the sealing of pipes and line strands as circular as possible.

In practice, cable strands are usually sealed by intumescent sealants, such as fire prevention foam, fire prevention mortar, or similar sealing materials, with the gap between the cable strand and the construction part being filled with the intumescent sealant. Here, it is not reliably ensured that the installation specifications according to the licenses of the fire prevention products are complied with, such as maximum number of cables laid, installation depth, maximum cross-section of the opening, and wall distances. Furthermore, the lasting sealing of cable conduits is very time-consuming.

BRIEF SUMMARY OF THE INVENTION

One or more embodiments of the present invention provide a fire protection sleeve that may be fastened at a wall or ceiling for sealing lines passing through walls or ceilings with an intumescent fire prevention insert. The fire protection sleeve preferably includes a wall mount encompassing the fire prevention insert, with the fire prevention insert being arranged at its interior, and at least one fastening part projecting radially outwardly in the area of at least one facial side of the wall mount, characterized in that the intumescent fire prevention insert is formed by an elastically deformable molded body, completely filling out the intumescent insert as a space encompassed by the housing.

BRIEF DESCRIPTION OF THE DRAWINGS

One or more embodiments of the invention are described in greater detail using the below preferred exemplary embodiments. In the figures.

DETAILED DESCRIPTION OF THE INVENTION

Figure 1:
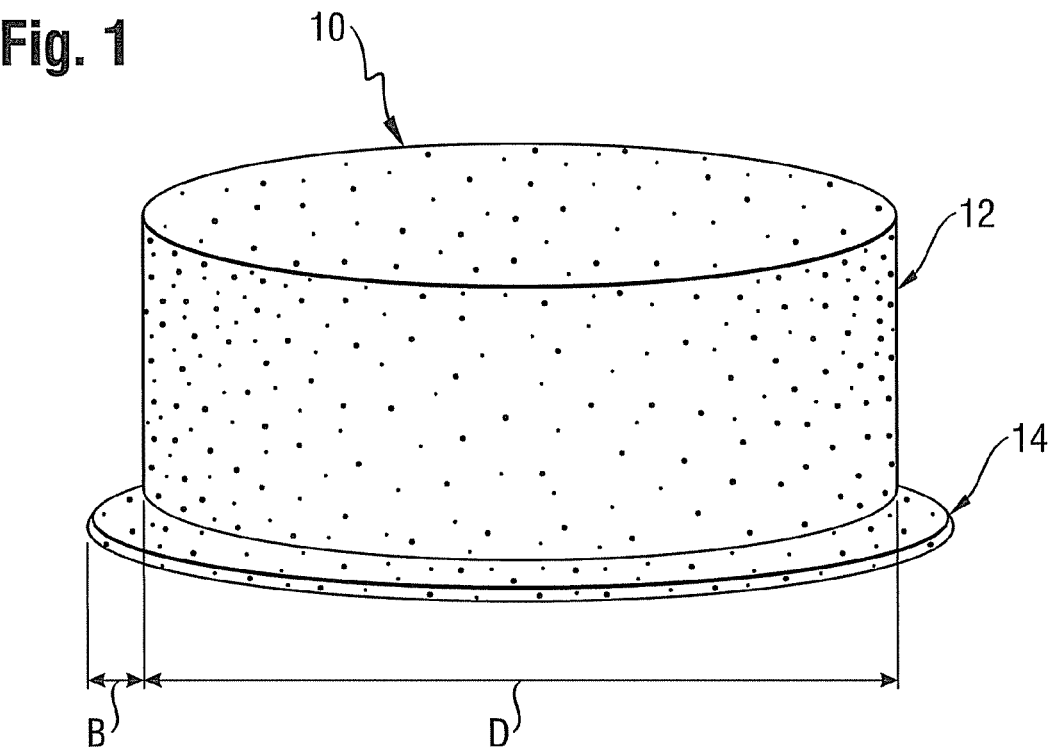
FIG. 1 shows a schematic view of the fire prevention insert according to a first embodiment of the invention.

One or more embodiments of the present invention create a fire prevention sleeve which is used more flexibly and may be adjusted on site with little expense to the respectively required pipe or cable diameters.

In order to attain this, it is provided according to one or more embodiments of the invention that the intumescent fire prevention insert is embodied as a molded body, preferably a cylindrical molded body, which may be elastically deformed and completely fill out the space encased by the housing.

Here, "may be elastically deformed" in the sense of one or more embodiments of the invention means that the material the fire prevention insert is made of is elastic to such an extent that any compression is easily possible, e.g., without any major force applied, such as by one hand, and the fire prevention insert may assume its original form. This way it is ensured that the lines or cables are engaged flush and thus are sealed from smoke gas. Particularly in cable strands this is advantageous because the material of the fire prevention insert presses into the gores between the exterior cables located next to each other and thus also seals them.

The molded body preferably comprises a foaming binder, which at least comprises an ash-forming and perhaps intumescent material mixture. Here, this binder serves as a compound-forming carrier for the ash-forming and perhaps intumescent material mixture. Preferably the material mixture is distributed homogeneously in the binder. The compound-forming carrier is preferably selected from a group comprising polyurethane, phenol-resins, polystyrene, polyolefin, such as polyethylene and/or polybutylene, melamine resin, melamine resin-foam, synthetic or natural rubber, cellulose, elastomers, and mixtures therefrom, with polyurethane being preferred.

The ash-forming and perhaps intumescent material mixture may comprise the fire prevention additives commonly used and known to one trained in the art, which in case of fire, thus under the impact of heat, foam and thus form a froth hindering the fire from spreading, such as an intumescent material based on an acid former, a compound yielding carbon, and a gas former. Preferably the intumescent material comprises a salt or an ester of an inorganic, non-volatile acid as the acid former, selected from sulfuric acid, phosphoric acid, and boric acid, a polyhydroxy-compound as the compound yielding carbon, and/or a thermoplastic or duroplastic polymer resin binder, and as a gas former a chloroparaffin, melamine, a melamine compound, particularly melamine cyanurate, melamine phosphate, melamine polyphosphate, tri(hydroxyl ethyl)-cyanurate, cyanamide, dicyanamide, dicyanadiamide, biguanidine, and/or a guanidine salt, particularly guanidine phosphate or guanidine sulfate.

The compound-forming carrier may further comprise an inorganic compound as an ablative additive, which comprises water, e.g., water of crystallization, tightly bonded and not evaporating at temperatures up to 100° C., however releases it in case of fire at 120° C. and thus is able to cool temperature-guiding parts, preferably an inorganic hydroxide or hydrate, particularly aluminum hydroxide, aluminum oxide hydrate, or partially hydrated aluminum hydroxides releasing water preferably at fire temperature and/or when subjected to flames. However, other inorganic hydroxides or hydrates releasing water when subjected to flames may also be used, such as described in EP 0 274 068 A2.

Such compounds, which may be used as mixtures of material in the fire prevention insert according to one or more embodiments of the invention, are known to one trained in the art and disclosed, for example, in the following publications, which are hereby explicitly included by way of reference: DE 30 25 309 A1, DE 30 41 731 A1, DE 33 02 416 A1, DE 34 11 327 A1, EP 0 043 952 B1, EP 0 051 106 B1, EP 0 061 024 B1, EP 0 116 846 B1, EP 0 158 165 B1, EP 0 274 068 A2, EP 1 347 549 A1, EP 1 641 895 B1, and DE 196 53 503 A1.

The production of the molded body occurs by mold foaming, such as reaction injection molding (RIM), according to DE 3917518, e.g., using Fomox® fire prevention foam or the material HILTI CP 65GN forming the insulation layer. Material which may be used for the purposes according to the invention are known from EP 0061024 A1, EP 0051106 A1, EP 0043952 A1, EP 0158165 A1, EP 0116846 A1, and U.S. Pat. No. 3,396,129 A, as well as EP 1347549 A1. Preferably the molded body comprises a polyurethane foam capable of intumescence, such as known from EP 0061024 A1, DE 3025309 A1, DE 3041731 A1, DE 3302416 A, and DE 3411 327 A1.

Due to the consistency of the foam, it is possible to seal wall penetrations immediately after production of the walls in a fire and smoke-proof fashion and only during the installation to cut one or more penetrating openings into the molded body of the fire prevention insert, with their diameters being precisely adjusted to the pipes and cables to be passed through. The elasticity of the material of the molded body also allows the precisely flush position of the molded body to pipes or cables and may seal the gores between the bundles of pipes or cables. Further the molded body may also be simply cut to seal already laid pipes and cables without here compromising the sealing against smoke gas.

The shape of the molded body is adjusted to the form of the fire prevention sleeve and beneficially cylindrical. The height of the cylindrical molded body is here again adjusted to the width of the wall mount of the fire prevention sleeve to be fastened at the wall and beneficially equivalent to its width. The diameter of the molded body is here equivalent to at least the interior diameter of the space defined by the sleeve in the assembled state, while it may be slightly larger in order to ensure a tight fit of the fire prevention insert in the fire prevention sleeve.

In a preferred embodiment of the invention, the molded body of the fire prevention insert is sized such that the height of the molded body is greater than the width of the wall part of the fire prevention sleeve so that the molded body projects beyond the wall mount. Beneficially, here the molded body projects only beyond the wall mount at the side facing the wall or the ceiling. Here, it is preferred to provide latches at the wall mount only at the circumferential line (exterior edge) of said wall mount, which is opposite the wall or the ceiling. This way the fire prevention insert is ensured from being pulled out or slipping out. In the assembled state the latches ensure, on the one hand, that in case of fire the intumescence of the fire prevention insert is aligned towards the opening of the construction part and, on the other hand, that the fire prevention insert may be effectively pressed to the wall or ceiling.

In an alternative embodiment the molded body comprises a flange at the base area facing the wall or ceiling extending perpendicular in reference to the molded body. Alternatively, the flange may also be formed by notches extending in the circumferential direction of the molded body such that the perimeter of the flange is at least equivalent to the perimeter of the molded body. Beneficially the flange is arranged such that it forms the outermost part of the side of the fire prevention sleeve facing the wall or the ceiling. This way, a smoke gas-sealed connection of the fire prevention sleeve to the wall penetration may be achieved in which the flange acts as the seal. Accordingly no additional sealing is required between the wall or the ceiling and the gap remaining at the cable strand using any sealing material. This is advantageous in that the perimeter of the sleeve only needs to be adjusted to the size of the wall or ceiling penetration with the user being largely flexible when filling the passage. In an incomplete filling of the passage with lines or cables it is not necessary to seal the remaining open gap with any additional fire prevention material, such as foam or the like, because by the flange and the material of the molded body sufficient smoke gas-sealing is given.

In both embodiments the perimeter of the flange is preferably equivalent to at least the exterior circumference of the wall mount. This way a better smoke gas sealing is achieved because the flange is pressed by the wall mount to the wall or ceiling.

The flange may here not be of such thickness that the distance between the sleeve, thus the wall mount and the fastening part, and the wall or ceiling is so long that no secure assembly of the fire prevention sleeve is possible any more. Accordingly it must be selected such that the fire prevention sleeve seals the opening in the construction part and may be assembled with ease at the wall or ceiling.

Another advantage of the flange is provided here in that the intumescent material directly contacts the wall or ceiling and thus in case of fire the intumescence also faces the direction of the wall or ceiling passage and not only radially inwardly in the direction towards the lines or cables, which leads to an additional sealing effect.

In order to limit the expansion of the fire prevention insert in case of fire in the axial direction away from the conduit to the maximum extent possible and to direct the intumescence radially inwardly in the direction towards the lines or cables several inwardly projecting latches are provided along at least a perimeter line at the circumference of the wall part, namely at least particularly along the perimeter line at the circumference of the wall mount, which is opposite the wall or ceiling side. This way, additionally any sliding out of the molded body is prevented when by the passed-through line or the passed-through cable a tension is applied upon the molded body.

In a preferred embodiment the latches are arranged both at the perimeter line of the wall mount facing the wall or ceiling as well as at the perimeter line of the wall mount facing away from the wall or ceiling. It is particularly advantageous when several radially inwardly projecting latches are arranged at the perimeter line facing the wall or ceiling, encompassed by the flange of the fire prevention insert. The flange formed by the notching and the latches cooperate particularly advantageously when the latches engage the notches of the molded body representing the flange. This way, the molded body is attached very tightly inside the sleeve and additional pressure may be applied upon the flange. Furthermore, by the molded body encompassing the latches it is prevented that the flange is bent over and thus incorrectly contacts the wall or ceiling.

In order to assemble the fire prevention sleeve according to the invention initially the wall mount is cut to length or selected according to the size of the fire prevention insert and placed around the fire prevention insert. The size, or the circumference, of the fire prevention part is preferably selected at least so large that the lines or cables to be sealed represent no more than 60% of the base area of the fire prevention insert. Any oversizing, e.g., a greater circumference of the fire prevention insert, is here considered not critical and advantageous if it is intended to subsequently guide additional lines and/or cables through the conduit because here no new fire prevention sleeve needs to be assembled but the existing one may be adjusted in a simple fashion. In this case, during the assembly of the fire prevention sleeve after the insertion of the lines or cables into the wall or ceiling conduit the fire prevention insert is notched and precisely the amount of material of the fire prevention insert may be cut out, preferably from the central area such that the fire prevention insert may be pressed with a slight pressure to the lines or cables when placing the sleeve about the lines or cables. This way the smoke gas sealing is ensured. The fire prevention sleeve produced in this manner is fastened at the wall or ceiling by conventional fastening parts, such as hooks which may engage the wall mount and comprise an opening for the fastening structure, such as a screw so that the fire prevention insert is pressed to the surface of the wall or ceiling and seals all gaps.

FIG. 1 shows a schematic view of a fire prevention insert 10 according to a first embodiment of the invention. The fire prevention insert 10 comprises a molded body 12 embodied as a solid cylinder and a flange 14 projecting by the width B beyond the diameter D of the solid cylinder. This flange 14 projects radially towards the outside and forms the part of the fire prevention sleeve directly contacting the wall or ceiling with its flat side.

In the example shown, the fire prevention insert 10 comprises foamed polyurethane with homogeneously distributed fire prevention additives therein and is formed in one piece, e.g., the molded body 12 and the flange 14 is produced in one piece by way of reaction injection molding (RIM).

Figure 2:
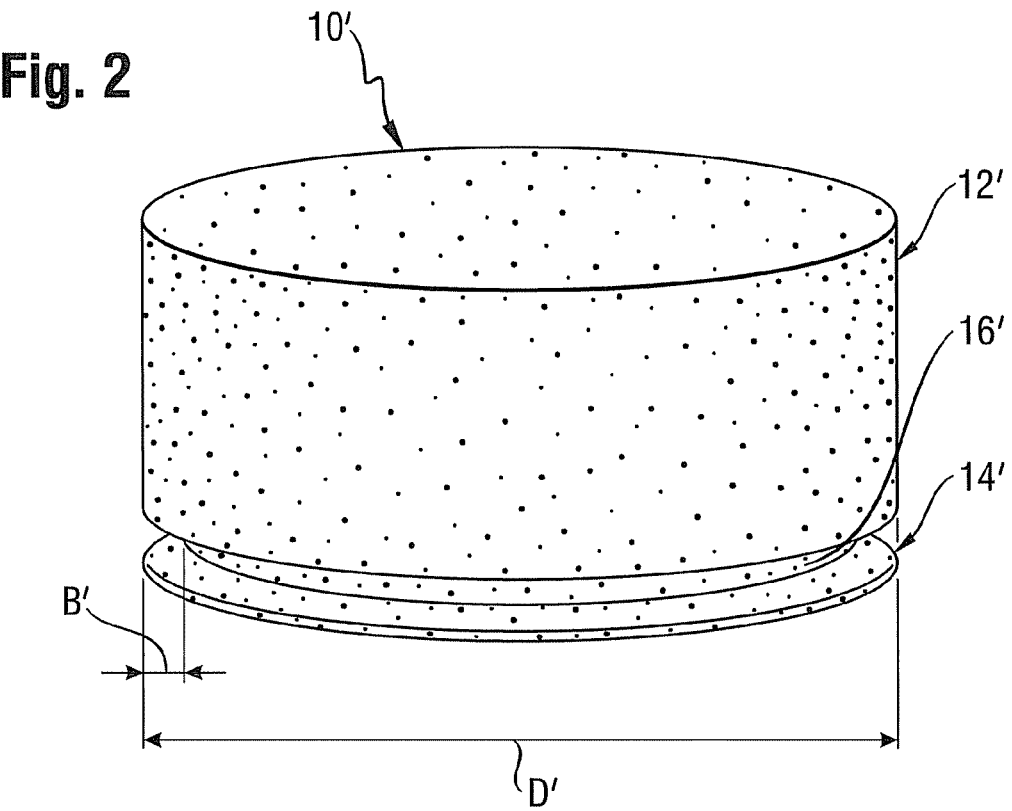
FIG. 2 shows a schematic view of the fire prevention insert according to another embodiment of the invention.

FIG. 2 shows a schematic view of a fire prevention insert 10' according to a second embodiment of the invention. In this embodiment, the fire prevention insert 10' comprises a molded body 12', which is also embodied as a solid cylinder and comprises a flange 14', with its width B' being equivalent to the diameter D' of the solid cylinder. The flange 14' is here formed by notches 16', extending in the circumferential direction over the entire perimeter of the molded body 12'.

Figure 3:
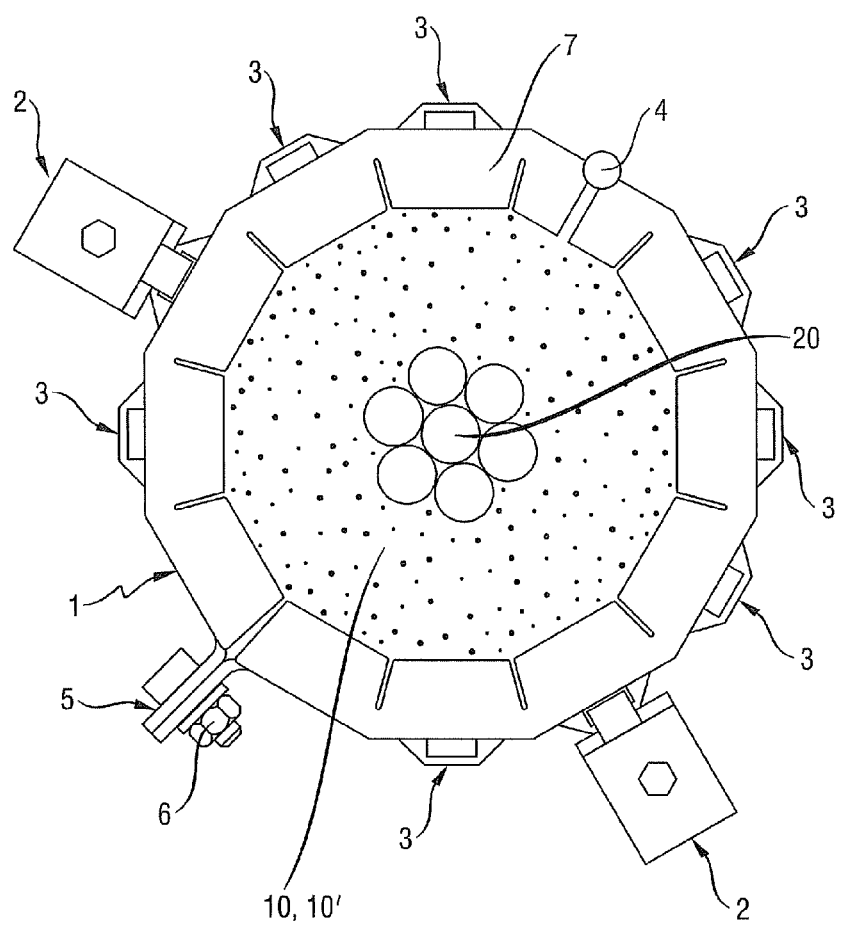
FIG. 3 shows a schematic view (top view) of a fire prevention sleeve according to the invention with the fire prevention insert of FIG. 2.

FIG. 3 shows in a top view the fire prevention sleeve, comprising a wall mount 1 with two elements embodied in a semi-cup shape fashion, which are pivotal in reference to each other via a common pivotal axis 4. The end sections of the wall mount 1, located opposite the pivotal axis 4, are formed by a radially projecting closure 5, which serves to stress the wall mount 1. The stressing occurs by at least one tension screw 6.

The wall mount 1 comprises a sheet metal profile with several latches 7, projecting radially inwardly, arranged at least at a perimeter line at the circumference of the wall mount 1 in order to form an essentially circular shape. Two fastening parts 2 projecting radially outwardly extend at the faces of the wall mount 1. The latches 7 allow the acceptance and the guidance of an insert 10, 10' with fire-retarding features.

The wall part 1 shows several latches 3, evenly distributed over the perimeter and essentially radially projecting at the circumference, which in combination with at least one fastening part 2 serve to fasten the tubular sleeve to the surface of the wall or ceiling. The tubular sleeve shown encompasses a line strand 20, comprising 7 individual strands, and laid through an opening in a construction part.

Alternatively (not shown) the sleeve may also comprise a part of a continuous tape cut to length. In general, the sleeve may represent any sleeve known and useful for the intended purpose.

Figure 4:
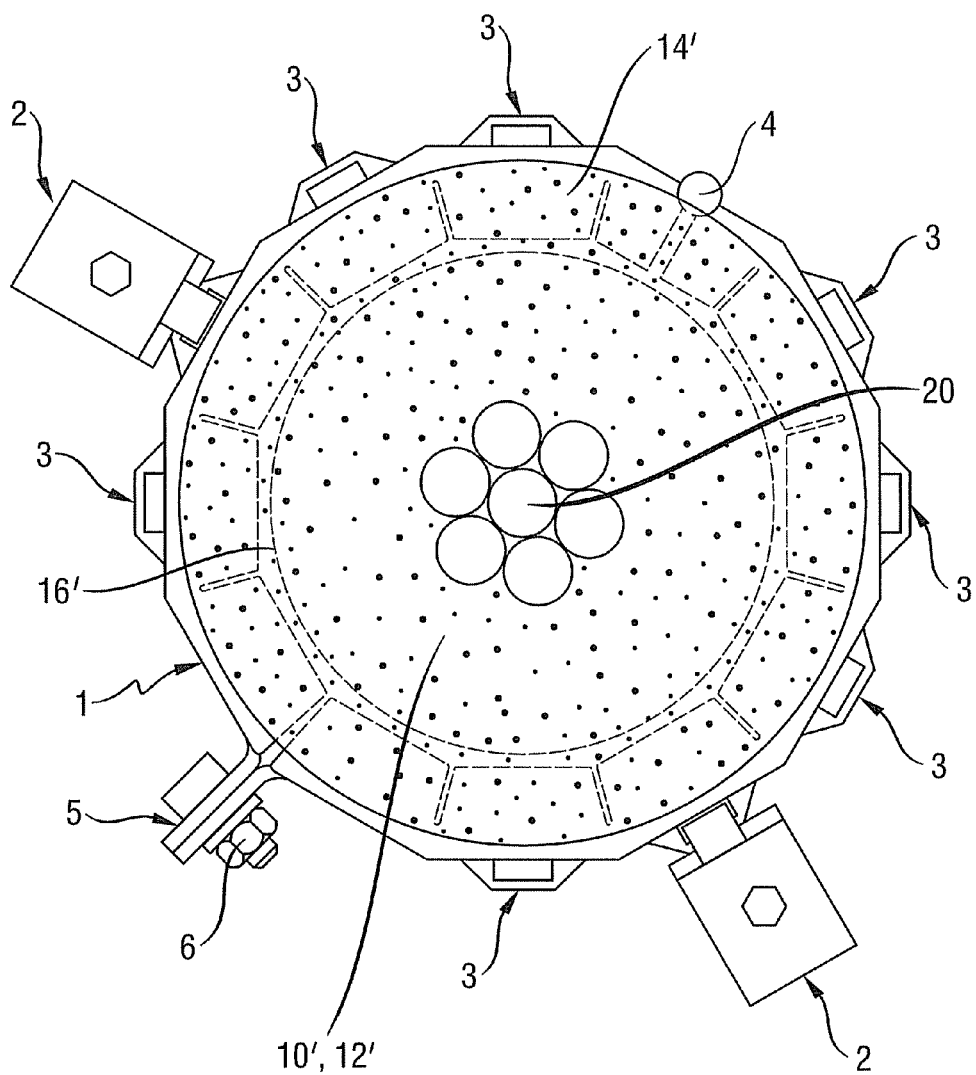
FIG. 4 shows a schematic view (from the bottom) of the fire prevention sleeve of FIG. 3.

FIG. 4 shows from the bottom the fire prevention sleeve shown in FIG. 3. Here, it is discernible that the flange 14' of the molded body 12' of the fire prevention insert 10' is located over the latches. The latches engage the notches 16' of the molded body 12' forming the flange 14'.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A fire prevention sleeve for sealing lines and/or cables guided through a wall or ceiling, said fire prevention sleeve comprising:
 an intumescent fire prevention insert;
 a wall mount defining a tubular sleeve having a base end associated with the wall or ceiling and a distal end opposite the base end, wherein the tubular sleeve is configured to surround the intumescent fire prevention insert when inserted in the tubular sleeve; and
 at least one fastening part projecting radially outward from at least one face of the wall mount proximate the base end of the tubular sleeve,
 wherein the intumescent fire prevention insert comprises an elastically-deformable, molded body that fills an interior of the tubular sleeve when placed in the tubular sleeve, wherein the elastically-deformable, molded body comprises a base end associated with the base end of the tubular sleeve and a flange extending radially outward from the base end of the elastically-deformable, molded body, wherein the elastically-deformable, molded body further comprises a notching toward the base end of the elastically-deformable, molded body that extends circumferentially around the elastically-deformable, molded body to form the flange with an outer diameter equivalent to at least an outer diameter of the elastically-deformable, molded body, and wherein a plurality of latches, projecting radially inwardly, are arranged along a circumference of the wall mount toward the base end of the tubular sleeve and are arranged to engage into the notching of the elastically-deformable, molded body.

2. The fire prevention sleeve of claim 1, wherein the elastically-deformable, molded body is embodied as a solid, cylindrically-shaped, molded body.

3. The fire prevention sleeve of claim 1, further comprising another plurality of latches, projecting radially inwardly, wherein the other plurality of latches are arranged along a circumference of the wall mount toward the distal end of the tubular sleeve and are further arranged to prevent a distal end of the intumescent fire prevention from sliding beyond the distal end of the tubular sleeve.

4. The fire prevention sleeve of claim 1, wherein the elastically-deformable, molded body has a height that is greater than a height of the tubular sleeve of the wall mount so that a base end of the elastically-deformable, molded body projects beyond the base end of the tubular sleeve when a distal end of the elastically deformable molded body aligns with the distal end of the tubular sleeve.

5. The fire prevention sleeve of claim 1, wherein the flange has an outer diameter that is at least equivalent to an exterior diameter of the wall mount.

6. The fire prevention sleeve of claim 1, wherein the flange has a thickness that is selected such that the flange is compressed between the at least one fastening part and the wall and/or ceiling when the wall mount is used to fasten the intumescent fire prevention insert to the wall or ceiling.

7. A fire prevention sleeve for sealing lines and/or cables guided through a wall or ceiling, said fire prevention sleeve comprising:

a wall mount defining an interior space between a base end associated with a wall or ceiling and a distal end opposite the base end;

at least one fastening part projecting radially outward from the wall mount proximate the base end and configured to affix the wall mount to the wall or ceiling; and an intumescent fire prevention insert comprising a solid, elastically-deformable, molded body sized to fill the interior space of the wall mount when placed in the wall mount, wherein:

the intumescent fire prevention insert further comprises a notching that extends circumferentially around the solid, elastically-deformable, molded body; and the wall mount further comprises a plurality of latches that project radially inwardly into the interior space and are arranged to engage into the notching of the intumescent fire prevention insert.

8. The fire prevention sleeve of claim 7, wherein the solid, elastically-deformable, molded body is embodied as a solid, cylindrically-shaped, molded body.

9. The fire prevention sleeve of claim 7, wherein the elastically deformable molded body has a height that is greater than a height of the wall mount so that a base end of the solid, elastically-deformable, molded body projects beyond the base end of the wall mount when a distal end of the solid, elastically-deformable, molded body aligns with the distal end of the wall mount.

10. The fire prevention sleeve of claim 7, wherein the solid, elastically-deformable, molded body comprises a base end associated with the base end of the wall mount and a flange extending radially outward from the base end of the solid, elastically-deformable, molded body.

11. The fire prevention sleeve of claim 10, wherein the notching extends circumferentially around the solid, elastically-deformable, molded body to form the flange with an outer diameter equivalent to at least an outer diameter of the solid, elastically-deformable, molded body.

12. The fire prevention sleeve of claim 7, wherein the wall mount comprises a first element pivotally coupled to a second element, wherein the first element and the second element, when in a closed position, form a tubular sleeve encompassing the interior space between the base end and distal end of the wall mount.

13. The fire prevention sleeve of claim 12, wherein the wall mount further comprises a closure and tension screw configured to stress the wall mount about the solid, elastically-deformable, molded body of the intumescent fire prevention insert.

* * * * *